United States Patent
Oh et al.

(10) Patent No.: US 7,826,344 B2
(45) Date of Patent: Nov. 2, 2010

(54) APPARATUS AND METHOD FOR TRANSMITTING PILOT SIGNAL IN A BWA COMMUNICATION SYSTEM USING TRANSMIT ANTENNAS

(75) Inventors: Jeong-Tae Oh, Yongin-si (KR); Won-Il Roh, Yongin-si (KR); Kyun-Byoung Ko, Goyang-si (KR); Seung-Joo Maeng, Seongnam-si (KR); Jae-Ho Jeon, Seongnam-si (KR); Pan-Yuh Joo, Yongin-si (KR); Chan-Byoung Chae, Seoul (KR); Hong-Sil Jeong, Suwon-si (KR); Sung-Ryul Yun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1112 days.

(21) Appl. No.: 11/176,930

(22) Filed: Jul. 7, 2005

(65) Prior Publication Data
US 2006/0023680 A1 Feb. 2, 2006

(30) Foreign Application Priority Data
Jul. 7, 2004 (KR) ........................ 10-2004-0052787

(51) Int. Cl.
*H04J 11/00* (2006.01)
*H04K 1/10* (2006.01)
(52) U.S. Cl. ....................................... 370/208; 375/260
(58) Field of Classification Search ......... 370/276–278, 370/310, 314, 340, 343, 345, 208–210; 455/42, 455/45, 46, 500, 512, 73, 103, 104; 375/219, 375/260
See application file for complete search history.

(56) References Cited

U.S. PATENT DOCUMENTS
6,876,675 B1 * 4/2005 Jones et al. ................. 370/509

(Continued)

FOREIGN PATENT DOCUMENTS
JP 2002-164826 6/2002

(Continued)

OTHER PUBLICATIONS
Mikihiko Takagi et al., Improved Performance of BER with Punctured Turbo Codes and Pilot Symbols on Fast Fading Channels, Mar. 8, 1999.

*Primary Examiner*—Aung S Moe
*Assistant Examiner*—Curtis A Alia
(74) *Attorney, Agent, or Firm*—The Farrell Law Firm, LLP (57) ABSTRACT

A method and system for transmitting reference signals in a BWA communication system using a first transmit antenna, a second transmit antenna, and a plurality of sub-carriers. Each of the sub-carriers occupies a sub-frequency domain. In the method, reference signals for identifying a first transmit antenna are transmitted through a second predetermined number of sub-carriers in a first mini sub-channel transmitted through the first transmit antenna and occupied by a predetermined time domain and sub-frequency domains of a first predetermined number of sub-carriers, and reference signals for identifying a second transmit antenna are transmitted through the second predetermined number of the sub-carriers in a second mini sub-channel transmitted through the second transmit antenna and occupied by the time domain and the sub-frequency domains of the first predetermined number of sub-carriers.

26 Claims, 6 Drawing Sheets

U.S. PATENT DOCUMENTS

| | | | |
|---|---|---|---|
| 7,000,173 B2 * | 2/2006 | Buckley et al. | 714/790 |
| 7,274,652 B1 * | 9/2007 | Webster et al. | 370/204 |
| 7,463,577 B2 * | 12/2008 | Sudo et al. | 370/208 |
| 7,535,869 B2 * | 5/2009 | Yoon et al. | 370/329 |
| 2002/0018529 A1 | 2/2002 | Dabak et al. | |
| 2002/0167962 A1 * | 11/2002 | Kowalski | 370/445 |
| 2003/0072254 A1 * | 4/2003 | Ma et al. | 370/208 |
| 2003/0072255 A1 * | 4/2003 | Ma et al. | 370/208 |
| 2003/0081576 A1 | 5/2003 | Kim et al. | |
| 2004/0022179 A1 * | 2/2004 | Giannakis et al. | 370/207 |
| 2004/0233838 A1 | 11/2004 | Sudo et al. | |
| 2004/0240571 A1 | 12/2004 | Murakami et al. | |
| 2005/0002323 A1 * | 1/2005 | Hadad | 370/203 |
| 2005/0013238 A1 * | 1/2005 | Hansen | 370/203 |

FOREIGN PATENT DOCUMENTS

| | | |
|---|---|---|
| JP | 2003-152680 | 5/2003 |
| JP | 2003-304216 | 10/2003 |
| JP | 2003-338802 | 11/2003 |
| JP | 2004-040232 | 2/2004 |
| RU | 2 119 255 | 9/1998 |
| RU | 2 182 747 | 5/2002 |
| WO | WO 03/034642 | 4/2003 |
| WO | WO 03/034644 | 4/2003 |

* cited by examiner

APPARATUS AND METHOD FOR TRANSMITTING PILOT SIGNAL IN A BWA COMMUNICATION SYSTEM USING TRANSMIT ANTENNAS

PRIORITY

This application claims priority under 35 U.S.C. §119 to an application entitled "Apparatus and Method for Transmitting Pilot Signal in BWA Communication System using Transmit Antennas" filed in the Korean Intellectual Property Office on Jul. 7, 2004 and assigned Serial No. 2004-52787, the contents of which are hereby incorporated by reference.

BACKGROUND OF THE INVENTION

1. Field of the Invention

The present invention relates generally to a Broadband Wireless Access (BWA) communication system, and more particularly to an apparatus and a method for transmitting pilot signals in a BWA communication system using a plurality of transmit antennas.

2. Description of the Related Art

In a $4^{th}$ generation (4G) communication system, which is the next generation communication system, research is being performed to provide users with services having various Qualities of Services (QoSs) at a high speed. In particular, in the current 4G communication system, research is being performed to support a high speed service for ensuring mobility and QoS in a BWA communication system, such as a wireless Local Area Network (LAN) system and a wireless Metropolitan Area Network (MAN) system.

Typical types of 4G communication system are an Institute of Electrical and Electronics Engineers (IEEE) 802.16a/d communication system and an IEEE 802.16e communication system. The IEEE 802.16a/d communication system and the IEEE 802.16e communication system utilize an Orthogonal Frequency Division Multiplexing (OFDM) scheme/an Orthogonal Frequency Division Multiple Access (OFDMA) scheme that support a broadband transmission network for a physical channel of the wireless MAN system. The IEEE 802.16a/d communication system and the IEEE 802.16e communication system transmit mass storage data at a high speed using the OFDM/OFDMA scheme. The IEEE 802.16a/d communication system considers only a single cell structure and stationary subscriber stations (SSs), i.e., the system does not accommodate the mobility of the SSs. However, the IEEE 802.16e communication system accommodates the mobility of an SS in the IEEE 802.16a communication system. Herein, an SS having the mobility will be referred to as a Mobile Station (MS).

Figure 1:
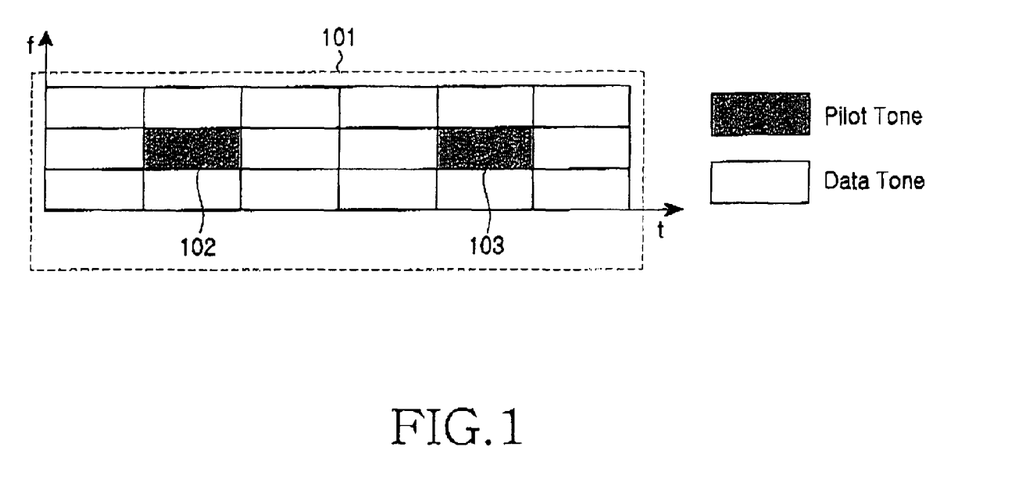
FIG. 1 is a diagram illustrating a conventional mini sub-channel structure in an IEEE 802.16d communication system using a SISO scheme.

FIG. 1 is a diagram illustrating a conventional mini sub-channel structure of an IEEE 802.16d communication system using a Single Input Single Output (SISO) scheme. Because the IEEE 802.16d communication system uses the OFDMA scheme, the IEEE 802.16d communication system uses a plurality of sub-carriers and a plurality of sub-channels each of which comprises at least one sub-carrier.

Referring to FIG. 1, a horizontal axis represents a time domain, a vertical axis represents a frequency domain, and one block occupied by the time domain and the frequency domain represents a tone, i.e., a sub-carrier. Herein, a frequency domain occupied by the sub-carrier will be referred to as a 'sub-frequency domain'. It is noted that the tone is used together with the sub-carrier for convenience of description.

One mini sub-channel 101 comprises a predetermined number of tones, e.g., 18 tones. When the SISO scheme is used, the mini sub-channel 101 comprises a predetermined number of pilot tones, e.g., two pilot tones 102 and 103, for a channel estimation. The remaining tones excluding the pilot tones 102 and 103 represent data tones.

As illustrated in FIG. 1, the pilot tones 102 and 103 are located in central positions of the mini sub-channel 101 for the channel estimation. For example, a transmitter, e.g., a Base Station (BS), transmits the pilot tones 102 and 103, so that a receiver, e.g., an MS or plurality of MSs, can estimate radio channel conditions on the downlink.

Because the mini sub-channel 101 comprises the two pilot tones 102 and 103, a ratio of pilot tones with respect to the total tones is 1/9.

As described above, the MSs estimate radio channel conditions using the pilot tones transmitted from the BS and demodulate received data according to the estimated radio channel conditions. Accordingly, estimating the radio channel conditions has a great influence on the entire system performance.

The sub-channel, which is a basic unit of data transmission in the IEEE 802.16d communication system, comprises three mini sub-channels. Accordingly, it is possible to transmit a symbol including 48 tones through one sub-channel.

The IEEE 802.16d communication system supports a multiple antenna scheme. In the multiple antenna scheme, a BS transmits signals through a plurality of transmit antennas. The multiple antenna scheme may be classified into a Multiple Input Multiple Output (MIMO) scheme and a Multiple Input Single Output (MISO) scheme according to the number of receive antennas used by MSs.

It is generally known that the multiple antenna scheme has number of advantages. For example, the multiple antenna scheme transmits signals through a plurality of transmit antennas, so that the transmitted signals have a plurality of transmit paths. Therefore, it is possible to acquire transmit antenna diversity gain. Further, the multiple antenna scheme transmits signals through a plurality of transmit antennas, so that the transmitted signals have a plurality of transmit spaces. Therefore, it is possible to acquire spatial diversity gain by using a Spatial Multiplexing (SM) scheme.

When the multiple antenna scheme is used as described above, it is possible to acquire the transmit antenna diversity gain and the spatial diversity gain. Accordingly, the multiple antenna scheme is used for efficiently transmitting information data. However, even though the multiple antenna scheme is used, the transmit antenna diversity gain and the spatial diversity gain may be varied according to actual radio channel conditions.

Further, when the multiple antenna scheme is used as described above, the MS must precisely estimate radio channel conditions from each of the transmit antennas to the receive antenna of the MS in order to demodulate the signals transmitted from the BS through each of the transmit antennas because it is possible to acquire the transmit antenna diversity gain and the spatial diversity gain only through the precise estimation of the radio channel conditions. In the conventional wireless communication system, the radio channel conditions are estimated using pilot signals.

However, when the transmit antennas are used as described above, transmit paths experienced by the signals transmitted through each of the transmit antennas may be varied. Therefore, radio channels experienced by the signals transmitted through each of the transmit antennas may also be varied. Accordingly, it is possible to achieve the precise radio channel estimation only when the precise identification of the transmit antennas is possible. In addition, it is possible to precisely demodulate received signals through the precise radio channel estimation. More specifically, because pilot signals are used for the radio channel estimation differently from general information data, the identification of the transmit antennas becomes more and more important.

In order to identify the transmit antennas, the mini sub-channel 101 must transmit pilot signals through each of the transmit antennas at different positions. However, in order to transmit the pilot signals through each of the transmit antennas, it is necessary to reduce the amount of transmittable data. As a result, as the number of the transmit antennas increases, the amount of transmittable data reduces.

For example, when one transmit antenna is used, one mini sub-channel 101 uses only two pilot tones 102 and 103 and can transmit data using the remaining tones, i.e., the data tones, as described in FIG. 1. However, when two transmit antennas, i.e., a first and a second transmit antenna, are used, it is impossible to transmit data through the second transmit antenna in a tone identical to the tone transmitting pilot signals through the first transmit antenna. As described above, the amount of transmittable data is reduced as the number of the transmit antennas increases, thereby decreasing the total system transmission capacity. Consequently, the entire system quality may deteriorate.

SUMMARY OF THE INVENTION

Accordingly, the present invention has been designed to solve the above and other problems occurring in the prior art. It is an object of the present invention to provide an apparatus and a method for transmitting pilot signals in a BWA communication system using a plurality of transmit antennas.

It is an object of the present invention to provide an apparatus and a method for transmitting pilot signals using a Convolutional Turbo Coding (CTC) scheme in a BWA communication system using transmit antennas.

In order to accomplish the above and other objects, according to an aspect of the present, there is provided a method for transmitting reference signals in a Broadband Wireless Access (BWA) communication system including a first transmit antenna, a second transmit antenna, and a plurality of sub-carriers, each of the sub-carriers occupying a sub-frequency domain. The method comprises the steps of transmitting reference signals for identifying the first transmit antenna through a second predetermined number of sub-carriers in a first mini sub-channel, the first mini sub-channel being transmitted through the first transmit antenna and occupied by a predetermined time domain and sub-frequency domains of a first predetermined number of sub-carriers; and transmitting reference signals for identifying the second transmit antenna through the second predetermined number of the sub-carriers in a second mini sub-channel, the second mini sub-channel being transmitted through the second transmit antenna and occupied by the time domain and the sub-frequency domains of the first predetermined number of sub-carriers.

According to another aspect of the present, there is provided a method for transmitting reference signals in a Broadband Wireless Access (BWA) communication system including a first transmit antenna, a second transmit antenna, and a plurality of sub-carriers, each of the sub-carriers occupying a sub-frequency domain. The method comprises the steps of generating coded symbols by coding information data to be transmitted according to a first predetermined coding scheme; generating coded symbols to be transmitted through the first transmit antenna and coded symbols to be transmitted through the second transmit antenna by coding the coded symbols according to a second predetermined coding scheme; inserting reference signals for identifying the first transmit antenna into a second predetermined number of sub-carriers in a first mini sub-channel, the first mini sub-channel being transmitted through the first transmit antenna and occupied by a predetermined time domain and sub-frequency domains of a first predetermined number of sub-carriers; inserting reference signals for identifying the second transmit antenna into the second predetermined number of the sub-carriers in a second mini sub-channel, the second mini sub-channel being transmitted through the second transmit antenna and occupied by the time domain and the sub-frequency domains of the first predetermined number of sub-carriers; inserting null data into sub-carriers including sub-frequency domains, which are identical to the sub-frequency domains of the sub-carriers for transmitting the reference signals for identifying the second transmit antenna from among sub-carriers excluding the sub-carriers, which transmit the reference signals for identifying the first transmit antenna, in the first mini sub-channel; inserting null data into sub-carriers including sub-frequency domains, which are identical to the sub-frequency domains of the sub-carriers for transmitting the reference signals for identifying the first transmit antenna from among sub-carriers excluding the sub-carriers, which transmit the reference signals for identifying the second transmit antenna, in the second mini sub-channel; inserting the coded symbols to be transmitted through the first transmit antenna into sub-carriers using a truncation scheme, which exclude the sub-carriers including the reference signals and the null data in the first mini sub-channel; inserting the coded symbols to be transmitted through the second transmit antenna into sub-carriers using the truncation scheme, which exclude the sub-carriers including the reference signals and the null data in the second mini sub-channel; processing signals of the first mini sub-channel to transmit the processed signals through the first transmit antenna; and processing signals of the second mini sub-channel to transmit the processed signals through the second transmit antenna.

According to further another aspect of the present, there is provided an apparatus for transmitting reference signals in a Broadband Wireless Access (BWA) communication system using a first transmit antenna, a second transmit antenna, and a plurality of sub-carriers, each of the sub-carriers occupying a sub-frequency domain. The apparatus comprises a first transmitter for transmitting reference signals for identifying the first transmit antenna through a second predetermined number of sub-carriers in a first mini sub-channel, the first mini sub-channel being transmitted through the first transmit antenna and occupied by a predetermined time domain and sub-frequency domains of a first predetermined number of sub-carriers; and a second transmitter for transmitting reference signals for identifying the second transmit antenna through the second predetermined number of the sub-carriers in a second mini sub-channel, the second mini sub-channel being transmitted through the second transmit antenna and occupied by the time domain and the sub-frequency domains of the first predetermined number of sub-carriers.

According to still another aspect of the present, there is provided an apparatus for transmitting reference signals in a Broadband Wireless Access (BWA) communication system using a first transmit antenna, a second transmit antenna, and a plurality of sub-carriers, each of the sub-carriers occupying a sub-frequency domain. The apparatus comprises a first coder for generating coded symbols by coding information data to be transmitted according to a first predetermined coding scheme; a second coder for coding the coded symbols according to a second predetermined coding scheme in order to generating coded symbols to be transmitted through the first transmit antenna and coded symbols to be transmitted through the second transmit antenna; a first reference signal sub-carrier inserter for inserting reference signals for identifying the first transmit antenna into a second predetermined number of sub-carriers in a first mini sub-channel, the first mini sub-channel being transmitted through the first transmit antenna and occupied by a predetermined time domain and sub-frequency domains of a first predetermined number of sub-carriers; a first sub-carrier mapper for inserting null data into sub-carriers including sub-frequency domains, which are identical to sub-frequency domains of the sub-carriers for transmitting the reference signals for identifying the second transmit antenna from among sub-carriers excluding the sub-carriers, which transmit the reference signals for identifying the first transmit antenna, in the first mini sub-channel, and inserting the coded symbols to be transmitted through the first transmit antenna into sub-carriers using a truncation scheme, which exclude the sub-carriers including the reference signals and the null data in the first mini sub-channel; a second reference signal sub-carrier inserter for inserting reference signals for identifying the second transmit antenna into the second predetermined number of the sub-carriers in a second mini sub-channel, the second mini sub-channel being transmitted through the second transmit antenna and occupied by the time domain and the sub-frequency domains of the first predetermined number of sub-carriers; a second sub-carrier mapper for inserting null data into sub-carriers including sub-frequency domains, which are identical to sub-frequency domains of the sub-carriers for transmitting the reference signals for identifying the first transmit antenna from among sub-carriers excluding the sub-carriers, which transmit the reference signals for identifying the second transmit antenna, in the second mini sub-channel, and inserting the coded symbols to be transmitted through the second transmit antenna into sub-carriers using the truncation scheme, which exclude the sub-carriers including the reference signals and the null data in the second mini sub-channel; a first transmitter for processing signals of the first mini sub-channel and transmitting the processed signals through the first transmit antenna; and a second transmitter for processing signals of the second mini sub-channel and transmitting the processed signals through the second transmit antenna.

BRIEF DESCRIPTION OF THE DRAWINGS

The above and other objects, features, and advantages of the present invention will be more apparent from the following detailed description taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, particular items are shown, but these are provided for helping the general understanding of the present invention. Accordingly, it will be understood by those skilled in the art that the present invention can be embodied even without these particular items.

In the following description of the present invention, a detailed description of known functions and configurations incorporated herein will be omitted when it may obscure the subject matter of the present invention.

The present invention proposes an apparatus and a method for transmitting pilot signals, which are reference signals, in a Broadband Wireless Access (BWA) communication system using a plurality of transmit antennas. More specifically, the present invention proposes an apparatus and a method for transmitting pilot signals using a Convolutional Turbo Coding (CTC) scheme in a BWA communication system using a plurality of transmit antennas.

As one example, the present application describes an Institute of Electrical and Electronics Engineers (IEEE) 802.16e communication system for convenience of description, but a scheme proposed by the present invention can also be applied to other communication systems. The IEEE 802.16e communication system uses an Orthogonal Frequency Division Multiplexing (OFDM) scheme/an Orthogonal Frequency Division Multiple Access (OFDMA) scheme in order to support a broadband transmission network for a physical channel of the wireless Metropolitan Area Network (MAN) system.

Figure 2:
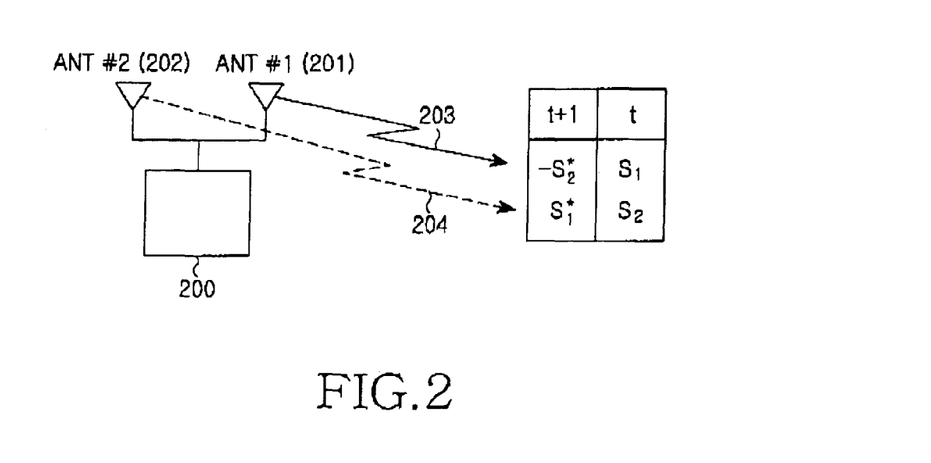
FIG. 2 is a diagram schematically illustrating a data transmission operation of a transmitter using a plurality of transmit antennas in an IEEE 802.16e communication system according to an embodiment of the present invention.

FIG. 2 is a diagram schematically illustrating a data transmission operation of a transmitter using a plurality of transmit antennas in the IEEE 802.16e communication system according to an embodiment of the present invention.

Referring to FIG. 2, it is assumed that a transmitter, e.g., a Base Station (BS) 200, uses a plurality of transmit antennas, e.g., two transmit antennas, i.e., a first transmit antenna (ANT#1) 201 and a second transmit antenna (ANT#2) 202. The first transmit antenna 201 and the second transmit antenna 202 simultaneously transmit data. The data transmitted through the first transmit antenna 201 and the second transmit antenna 202 may be varied according to a coding scheme used by the BS 200.

Table 1 below shows transmission data according to transmission timing when the BS 200 uses a Space Time Block Code (STBC) coding scheme.

TABLE 1

|  | t | t + 1 |
|---|---|---|
| first transmit antenna 201 | $S_1$ | $-S_2^*$ |
| second transmit antenna 202 | $S_2$ | $S_1^*$ |

Referring to table 1, if data $S_1$ and $S_2$ are inputted, the data $S_1$ is transmitted through the first transmit antenna 201 and the data $S_2$ is transmitted through the second transmit antenna 202 at a timing point t. At a timing point (t+1), the next transmission time, the data $-S^*_2$ is transmitted through the first transmit antenna 201 and the data $S^*_1$ is transmitted through the second transmit antenna 202.

As described above, the BS 200 transmits different coded symbols for the same data through the first transmit antenna 201 and the second transmit antenna 202 using the STBC coding scheme at the different timing points, i.e., the timing point t and the timing point (t+1), such that an MS can estimate radio channel conditions according to each transmit antenna.

Figure 3:
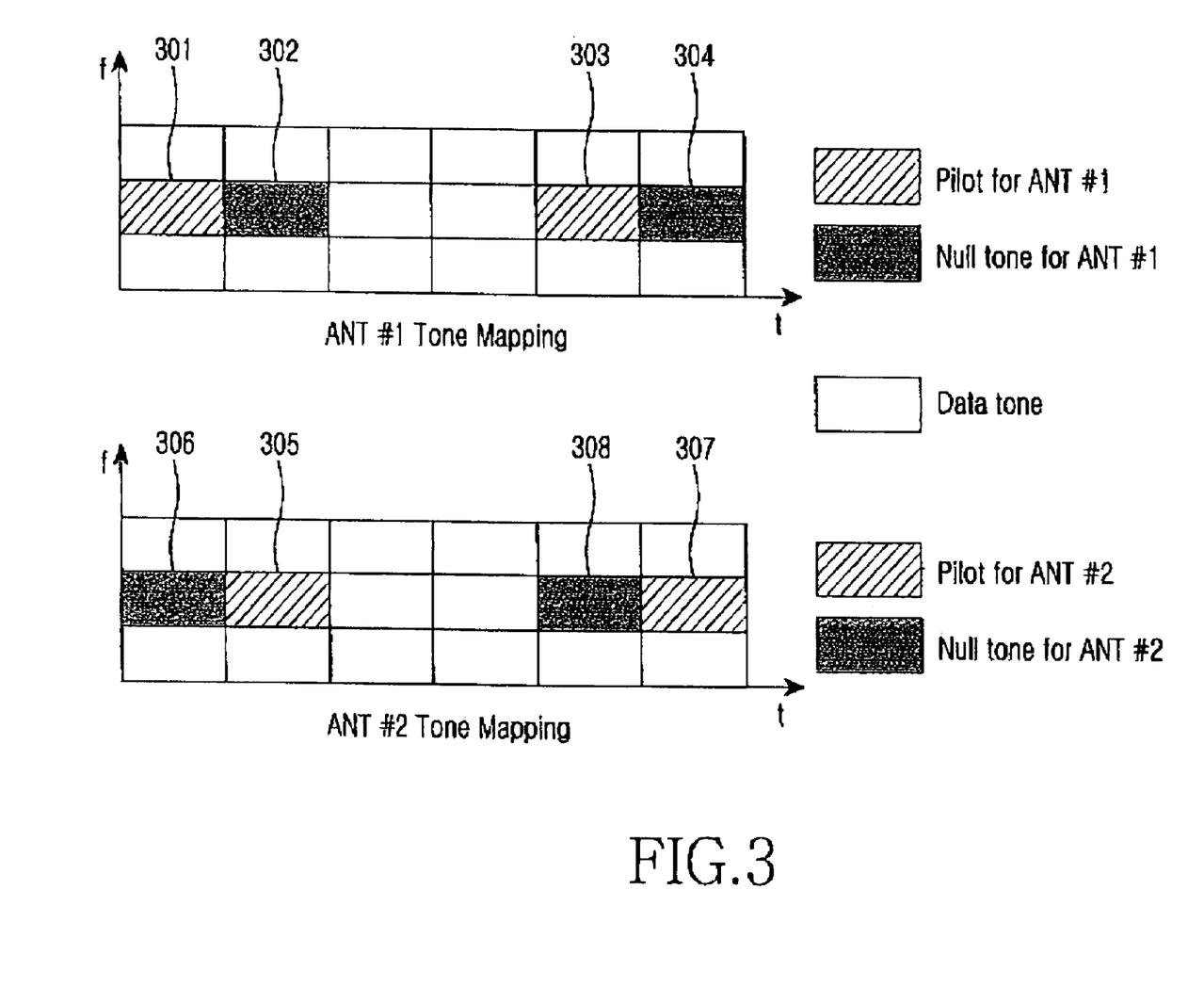
FIG. 3 is a diagram illustrating a mini sub-channel structure in an IEEE 802.16e communication system using a plurality of transmit antennas according to an embodiment of the present invention.

FIG. 3 is a diagram illustrating a mini sub-channel structure in the IEEE 802.16e communication system using a plurality of transmit antennas according to an embodiment of the present invention. The mini sub-channel structure of FIG. 3 illustrates a mini sub-channel structure when the BS uses the two transmit antennas as described in FIG. 2. In order to estimate radio channel conditions of each of the two transmit antennas, specific pilot signals must be transmitted according to each transmit antenna. However, if pilot tones for identifying the two transmit antennas are added to the mini sub-channel structure, when a Single Input Single Output (SISO) scheme as described in FIG. 1 in the prior art is used, a ratio of the pilot tones with respect to the total tones increases. As indicated above, it is noted that the tone is used together with the sub-carrier for convenience of description.

Because data throughput deteriorates as the ratio of the pilot tones with respect to the total tones increases, the present invention punctures a predetermined number of data tones and inserts pilot tones into positions of the punctured data tones, in order to add the pilot tones for identifying the transmit antennas, while preventing a data rate from deteriorating. Hereinafter, an operation for puncturing the data tones and inserting the pilot tones into the positions of the punctured data tones will be described.

Referring to FIG. 3, a scheme for mapping a tone to a mini sub-channel transmitted through the first transmit antenna and a scheme for mapping a tone to a mini sub-channel transmitted through the second transmit antenna are different. The mini sub-channel transmitted through the first transmit antenna comprises two pilot tones 301 and 303. Herein, data should not be transmitted through tones 306 and 308 in the mini sub-channel transmitted through the second transmit antenna 202, which are located in the same positions as those in which the pilot tones 301 and 303 exist.

The mini sub-channel transmitted through the second transmit antenna comprises two pilot tones 305 and 307. Herein, data should not be transmitted through tones 302 and 304 in the mini sub-channel transmitted through the first transmit antenna 201, which are located in the same positions as those in which the pilot tones 305 and 307 exist.

When the pilot tones and the data tones are constructed in this way, it is possible to estimate channel conditions experienced by signals transmitted through each of the transmit antennas. However, if mini sub-channel signals are transmitted in this way when multiple transmit antennas are used, data transmission efficiency may deteriorate and it is difficult to reliably transmit information data because the coded information data, i.e., the coded symbols, must be punctured, as described in the prior art.

Accordingly, the present invention encodes information data using a CTC encoding scheme, and enables a parity symbol, which is a coded symbol corresponding to a parity from among the coded symbols, to be located in a tone corresponding to a pilot tone transmitting pilot signals through a different transmit antenna instead of a corresponding transmit antenna, such that the parity symbol is truncated instead of a data symbol. Further, a null tone is inserted into a position from which the data symbol has been truncated. That is, null data is transmitted through a tone of the position from which the data symbol has been truncated.

Figure 4:
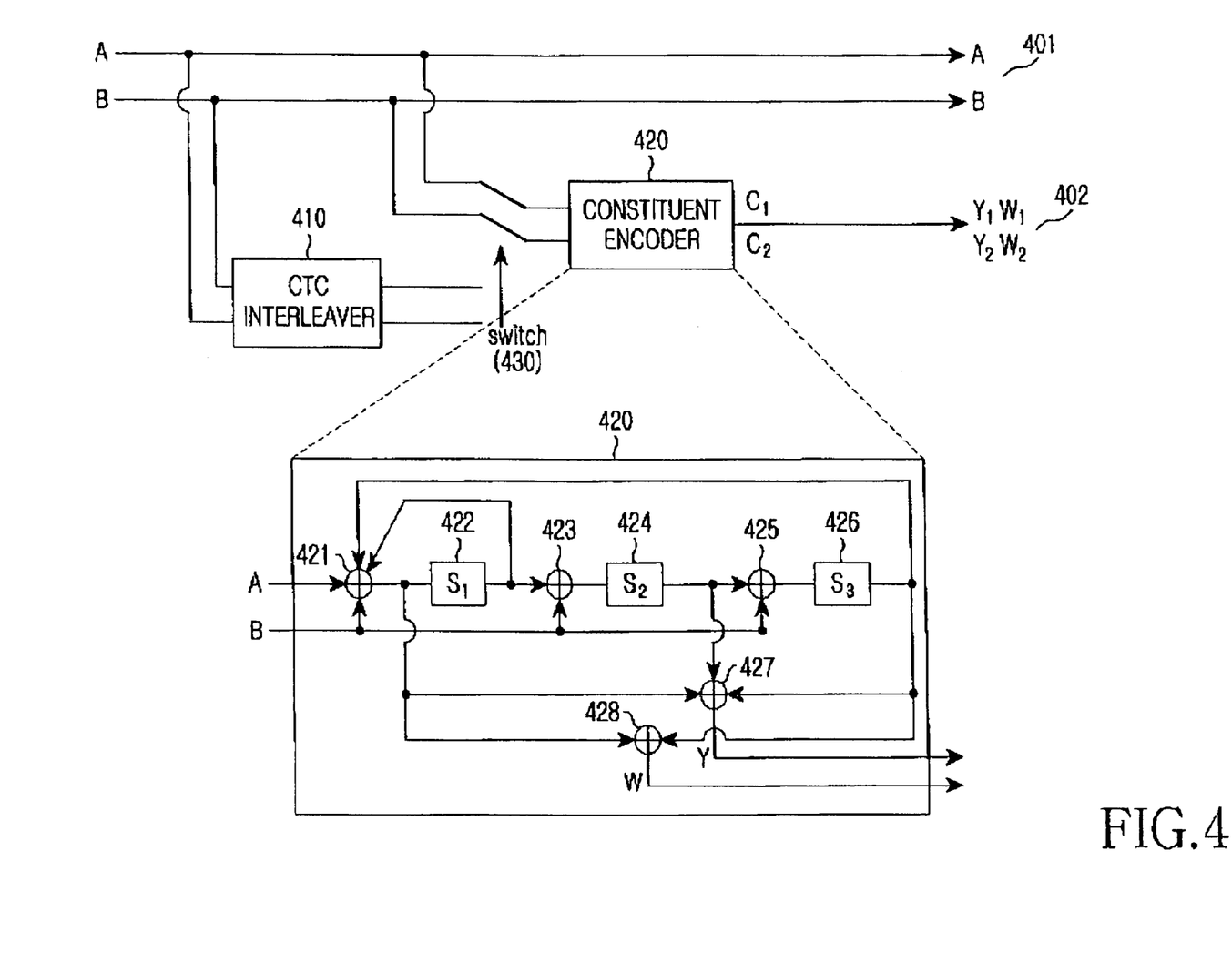
FIG. 4 is a diagram illustrating a CTC coder in an IEEE 802.16e communication system according to an embodiment of the present invention.

FIG. 4 is a diagram illustrating a CTC encoder in the IEEE 802.16e communication system according to an embodiment of the present invention. Herein, it is assumed that the CTC coder has a coding rate of 1/3 (R=1/3).

Referring to FIG. 4, when information data streams A and B are input, the CTC encoder outputs the information data streams A and B (401). The information data streams A and B output from the CTC encoder comprise systematic symbols.

After receiving the information data streams A and B, the CTC encoder interleaves the received information data streams A and B through a CTC interleaver 410 and outputs the interleaved signals to a constituent encoder 420. The CTC interleaver 410 is connected to a switch 430 that enables the interleaved signals to be sequentially output through the constituent encoder 420 as two pairs of parity symbols. When the constituent encoder 420 encodes the information data streams A and B, the switch 430 performs a switching operation to input the signals output from the CTC interleaver 410 to the constituent encoder 420.

FIG. 4 illustrates the two pairs of parity symbols $(Y_1, W_1)$ and $(Y_2, W_2)$ sequentially output from the constituent encoder 420. Accordingly, the coding rate R of 1/3 is actually satisfied.

The constituent encoder 420 comprises five adders, i.e., a first adder 421, a second adder 423, a third adder 425, a fourth adder 427, and a fifth adder 428, and three delayers, i.e., a first delayer 422, a second delayer 424, and a third delayer 426. Signals $Y_1$ and $Y_2$ are sequentially output from the fourth adder 427, and signals $W_1$ and $W_2$ are sequentially output from the fifth adder 428, thereby generating the two pairs of parity symbols $(Y_1, W_1)$ and $(Y_2, W_2)$(402).

The symbols coded through the CTC encoder in this way are interleaved again, which will be described in more detail with reference to FIG. 5.

Figure 5:
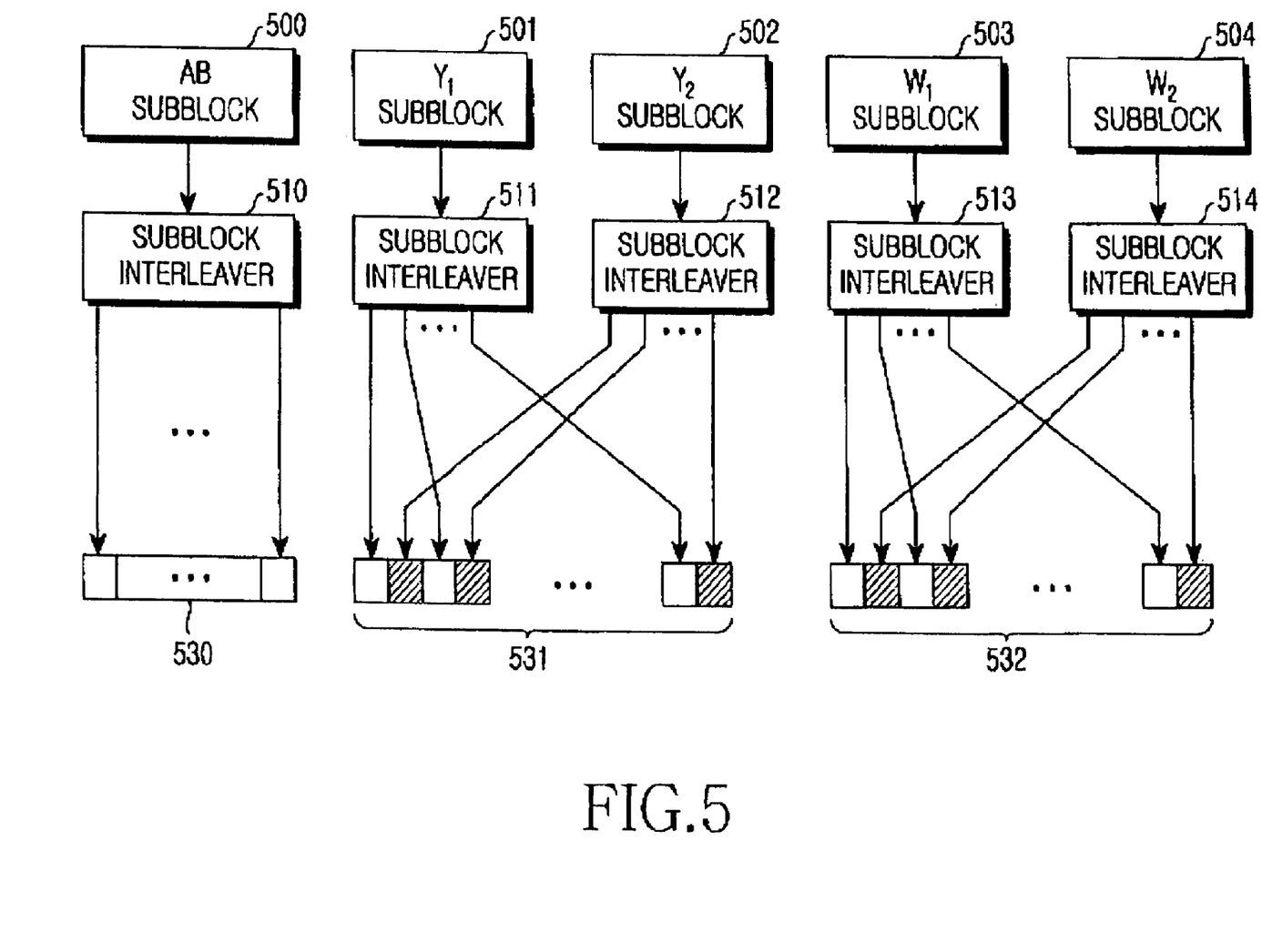
FIG. 5 is a diagram illustrating an interleaving operation for a systematic symbol stream and a parity symbol stream output from a CTC coder in an IEEE 802.16e communication system according to an embodiment of the present invention.

FIG. 5 is a diagram schematically illustrating an interleaving operation for the systematic symbol stream and the parity symbol stream output from the CTC encoder in the IEEE 802.16e communication system according to an embodiment of the present invention. Referring to FIG. 5, an AB sub-block 500 is obtained by connecting, in serial, two systematic symbol streams, i.e., a systematic symbol stream A and a systematic symbol stream B. A $Y_1$ sub-block 501 is a parity symbol stream $Y_1$, a $Y_2$ sub-block 502 is a parity symbol stream $Y_2$, a $W_1$ sub-block 503 is a parity symbol stream $W_1$, and a $W_2$ sub-block 504 is a parity symbol stream $W_2$. The $Y_1$ sub-block 501 and the $Y_2$ sub-block 502 represent symbol streams output from the fourth adder 427 as described in FIG. 4, and the $W_1$ sub-block 503 and the $W_2$ sub-block 504 represent symbol streams output from the fifth adder 428 as described in FIG. 4. These symbol streams output as described above are interleaved by the following scheme:

(1) the symbols comprised in a systematic part are interleaved in the systematic part;

(2) the parity symbols are interleaved between the parity symbol streams output from the same adder; and (3) in the interleaving between parity symbols, the parity symbols are arranged in such a manner that they are alternately taken one-by-one from the two parity symbol streams.

That is, the AB sub-block 500 is interleaved in a sub-block interleaver 510. The $Y_1$ sub-block 501 and the $Y_2$ sub-block 502 are interleaved in a sub-block interleaver 511 and a sub-block interleaver 512. The $W_1$ sub-block 503 and the $W_2$ sub-block 504 are interleaved in a sub-block interleaver 513 and a sub-block interleaver 514.

The symbol streams interleaved by the interleaving scheme as described above are generated as a systematic symbol stream or parity symbol streams. That is, the AB sub-block 500 is interleaved so as to be generated as a final systematic symbol stream 530. The $Y_1$ sub-block 501 and the $Y_2$ sub-block 502 are interleaved so as to be generated as a parity symbol stream 531. The $W_1$ sub-block 503 and the $W_2$ sub-block 504 are interleaved so as to be generated as another parity symbol stream 532. Accordingly, the final coding rate is 1/3.

When the symbol streams are transmitted, the symbol streams are transmitted in an order as illustrated in FIG. 5. That is, the systematic symbol stream 530 is transmitted for the first time and the parity symbol stream 532 is transmitted for the last time. The CTC encoder as described above has a characteristic in which it transmits a symbol stream, which represents the most important information, i.e., important information having the highest priority, for the first time. Accordingly, when using the CTC encoder, the CTC encoder has a better coding performance when the puncture is performed for the last symbols output from the CTC encoder than when randomly puncturing data. That is, when the CTC encoder is used, data should not be randomly punctured. It is necessary to remove data from the last symbols output from the CTC encoder to improve the coding performance.

Figure 6:
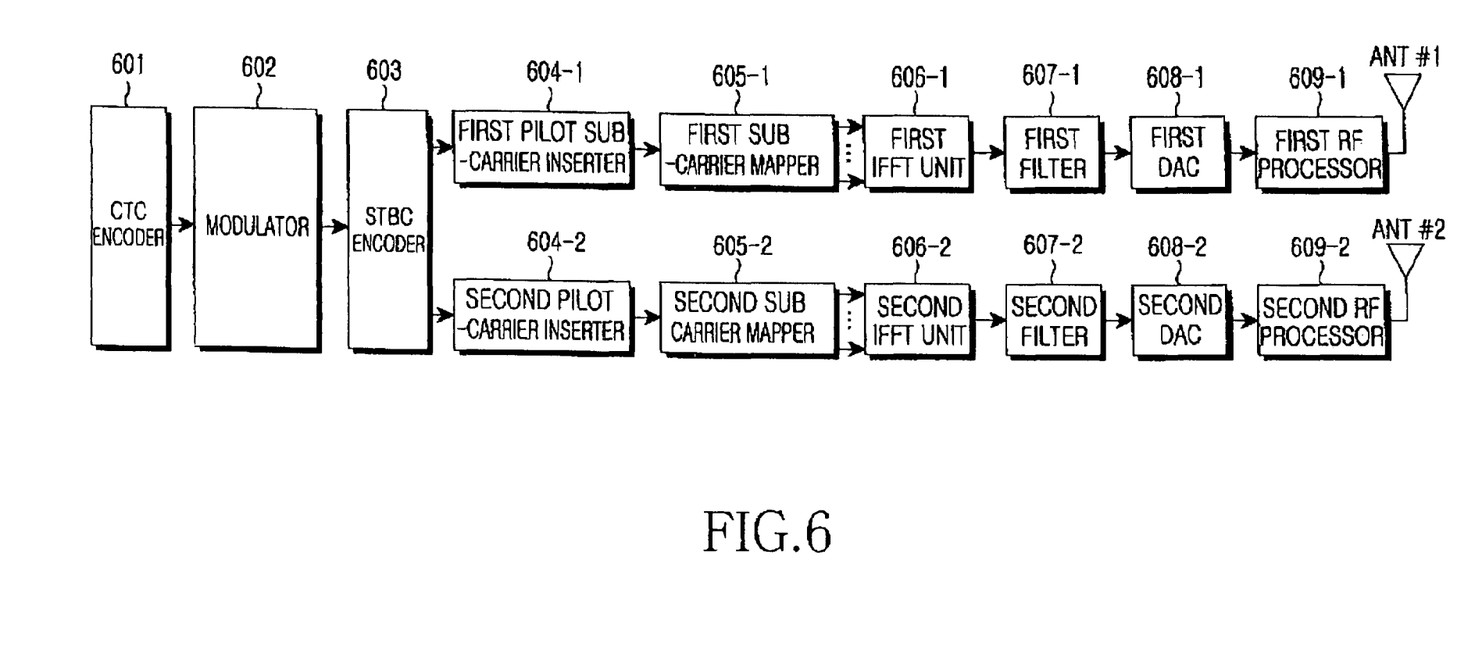
FIG. 6 is a block diagram illustrating a transmitter in an IEEE 802.16e communication system according to an embodiment of the present invention.

FIG. 6 is a block diagram illustrating a transmitter in the IEEE 802.16e communication system according to an embodiment of the present invention. The transmitter comprises a CTC encoder 601, a modulator 602, an STBC encoder 603, a first pilot sub-carrier inserter 604-1, a second pilot sub-carrier inserter 604-2, a first sub-carrier mapper 605-1, a second sub-carrier mapper 605-2, a first Inverse Fast Fourier Transform (IFFT) unit 606-1, a second IFFT unit 606-2, a first filter 607-1, a second filter 607-2, a first Digital-to-Analog Converter (DAC) 608-1, a second DAC 608-2, a first Radio Frequency (RF) processor 609-1, a second RF processor 609-2, a first transmit antenna ANT#1, and a second transmit antenna ANT#2.

If information data streams to be transmitted to the transmitter are input, the information data streams are transferred to the CTC encoder 601. The CTC encoder 601 codes the information data streams using a CTC encoding scheme and outputs the coded symbol streams to the modulator 602. The modulator 602 inputs the coded symbol streams output from the CTC encoder 601, modulates the input symbol streams using a predetermined modulation scheme, e.g., a Quadrature Phase Shift Keying (QPSK) scheme, and outputs the modulated symbol streams to the STBC encoder 603.

The STBC encoder 603 inputs the signals output from the modulator 602 and encodes the input signals using the STBC scheme. The STBC encoder 603 outputs a coded symbol stream, which is to be transmitted through the first transmit antenna, to the first pilot sub-carrier inserter 604-1, and outputs a coded symbol stream, which is to be transmitted through the second transmit antenna, to the second pilot sub-carrier inserter 604-2.

The first pilot sub-carrier inserter 604-1 inputs the signals output from the STBC encoder 603, inserts pilot sub-carriers to be transmitted through the first transmit antenna, and outputs signals including the pilot sub-carriers to the first sub-carrier mapper 605-1. The first pilot sub-carrier inserter 604-1 constructs a mini sub-channel as described in FIG. 3. Because this operation has been described in detail with reference FIG. 3 above, a detailed description will be omitted here.

The first sub-carrier mapper 605-1 maps the signals output from the first pilot sub-carrier inserter 604-1 according to the types of a sub-carrier to be applied to the transmitter, and outputs the mapped signals to the first IFFT unit 606-1. The first IFFT unit 606-1 performs an IFFT for the signals output from the first sub-carrier mapper 605-1 in order to generate signals on a time domain, and outputs the generated signals to the first filter 607-1.

The first filter 607-1 inputs and filters the signals output from the first IFFT unit 606-1 and outputs the filtered signals to the first DAC 608-1. The first DAC 608-1 converts the signals output from the first filter 607-1 into analog signals and outputs the analog signals to the first RF processor 609-1. The first RF processor 609-1, including a front end unit, etc., RF-processes the analog signals output from the first DAC 608-1, and transmits the processed signals through the first transmit antenna.

The second pilot sub-carrier inserter 604-2 inputs the signals output from the STBC encoder 603, inserts pilot sub-carriers to be transmitted through the second transmit antenna, and outputs signals including the pilot sub-carriers to the second sub-carrier mapper 605-2. The second pilot sub-carrier inserter 604-2 constructs a mini sub-channel as described in FIG. 3. As indicated above, because this operation has been described in detail in FIG. 3, a detailed description will be omitted here.

The second sub-carrier mapper 605-2 maps the signals output from the second pilot sub-carrier inserter 604-2 according to the types of a sub-carrier to be applied to the transmitter, and outputs the mapped signals to the second IFFT unit 606-2. The second IFFT unit 606-2 performs an IFFT for the signals output from the second sub-carrier mapper 605-2 in order to generate signals on a time domain, and outputs the generated signals to the second filter 607-2.

The second filter 607-2 inputs and filters the signals output from the second IFFT unit 606-2 and outputs the filtered signals to the second DAC 608-2. The second DAC 608-2 converts the signals output from the second filter 607-2 into analog signals and outputs the analog signals to the second RF processor 609-2. The second RF processor 609-2, including a front end unit, etc., RF-processes the analog signals output from the second DAC 608-2, and transmits the processed signals through the second transmit antenna.

Figure 7:
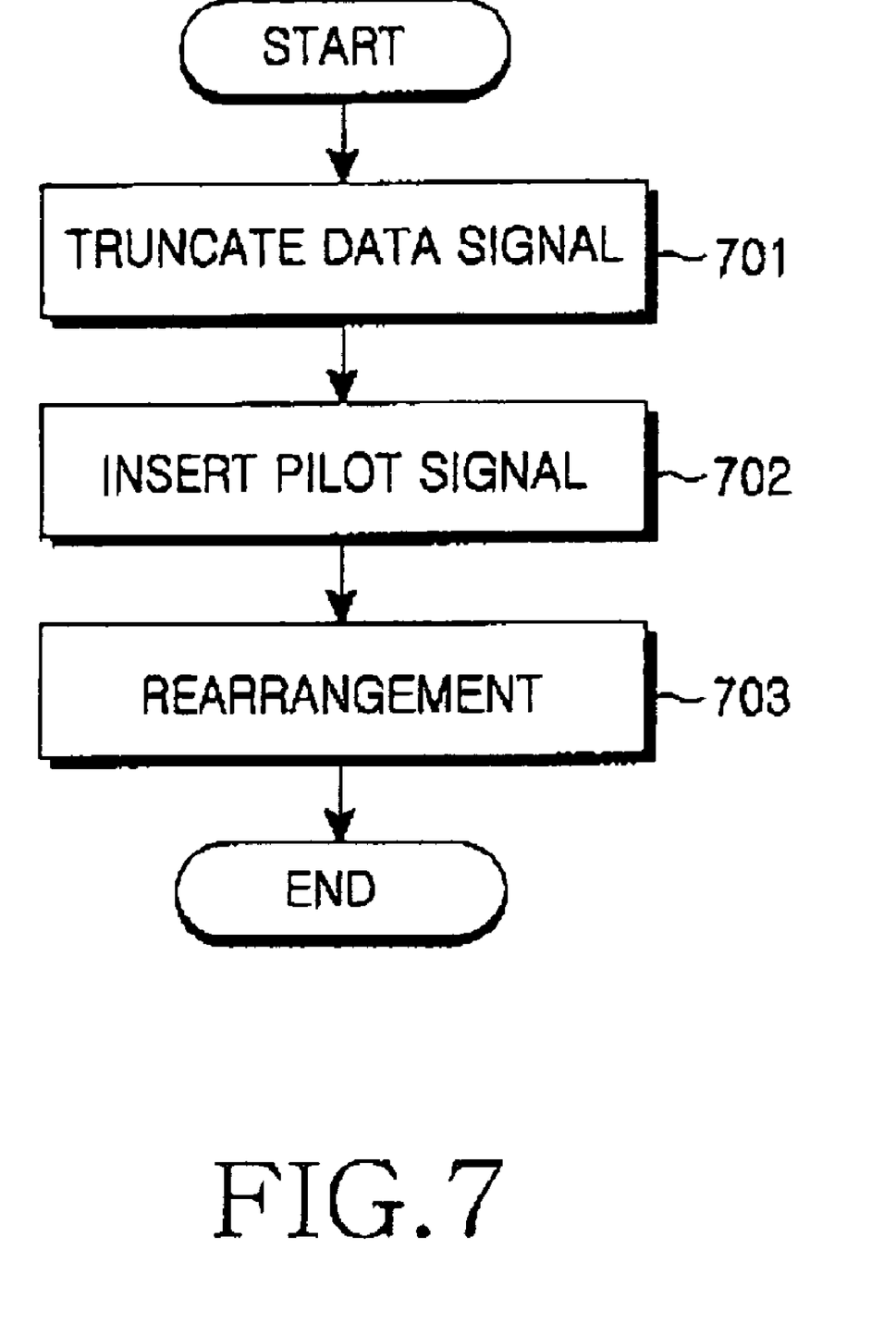
FIG. 7 is a flow diagram illustrating an insertion operation of pilot sub-carriers performed by the first pilot sub-carrier inserter and the second pilot sub-carrier inserter of FIG. 6.

FIG. 7 is a flow diagram illustrating an insertion operation of the pilot sub-carriers performed by the first pilot sub-carrier inserter 604-1 and the second pilot sub-carrier inserter 604-2. However, for convenience of description, the insertion operation will only be described with reference to the operation of the first pilot sub-carrier inserter 604-1.

Referring to FIG. 7, in step 701, the first pilot sub-carrier inserter 604-1 inputs the signals output from the STBC encoder 603 and performs a data truncation according to the structure of a mini sub-channel to be transmitted through the first transmit antenna. The data truncation is performed for parity symbols, instead of systematic symbols, by using the characteristics of the CTC encoding scheme in order to prevent performance deterioration, as described above. Further, in the data truncation, it is inevitably necessary to consider insertion of pilot signals and sub-carriers that cannot transmit data due to transmission of the pilot signals through another transmit antenna, i.e., the second transmit antenna.

In step 702, the first pilot sub-carrier inserter 604-1 inserts pilot signals to be transmitted through the first transmit antenna into a corresponding pilot sub-carrier. The insertion of the pilot signals is performed for a sub-carrier without data as described above. In step 703, the first pilot sub-carrier inserter 604-1 rearranges symbols, including the pilot signals, from which data is truncated, and outputs the symbols to the first sub-carrier mapper 605-1. Thereafter, the procedure ends.

Herein, the symbols are rearranged to represent the mini sub-channel structure.

According to the present invention, as described above, when an IEEE 802.16e communication system uses a plurality of transmit antennas, pilot signals for identifying the transmit antennas are transmitted, such that the estimation performance for radio channel conditions can be maximized. Further, a data truncation scheme is used when the pilot signals for identifying the transmit antennas are transmitted, so that estimation for radio channel conditions can be performed, which can minimize system capacity reduction, while maintaining a data rate.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting reference signals in a Broadband Wireless Access (BWA) communication system including a first transmit antenna, a second transmit antenna, and a plurality of sub-carriers, each of the sub-carriers occupying a sub-frequency domain, the method comprising the steps of:
    (1) transmitting reference signals for identifying the first transmit antenna through a second predetermined number of sub-carriers in a first mini sub-channel, the first mini sub-channel being transmitted through the first transmit antenna and occupied by a predetermined time domain and sub-frequency domains of a first predetermined number of sub-carriers, wherein, after the second predetermined number of sub-carriers in the first mini sub-channel are truncated by using a truncation scheme, the reference signals are inserted in the truncated second predetermined number of sub-carriers in the first mini-sub-channel and transmitted; and
    (2) transmitting reference signals for identifying the second transmit antenna through the second predetermined number of the sub-carriers in a second mini sub-channel, the second mini sub-channel being transmitted through the second transmit antenna and occupied by the time domain and the sub-frequency domains of the first predetermined number of sub-carriers wherein, after the second predetermined number of sub-carriers in the second mini-sub-channel are truncated by using the truncation scheme, the reference signals are inserted in the truncated second predetermined number of sub-carriers in the second mini sub-channel and transmitted,
    wherein the sub-carriers through which the reference signals for identifying the first transmit antenna are transmitted comprise sub-frequency domains different from the sub-frequency domains occupied by the sub-carriers through which the reference signals for identifying the second transmit antenna are transmitted,
    wherein transmitting the reference signals for identifying the first transmit antenna further comprises transmitting null data in the first mini sub-channel through sub-carriers including sub-frequency domains that are identical to the sub-frequency domains of the sub-carriers for transmitting the reference signal for identifying the second transmit antenna,
    wherein transmitting the reference signals for identifying the second transmit antenna further comprises transmitting null data in the second mini sub-channel through sub-carriers including sub-frequency domains that are identical to the sub-frequency domains of the sub-carriers for transmitting the reference signals for identifying the first transmit antenna,
    wherein the reference signals for identifying the first and second transmit antennas are inserted into sub-carriers that were previously allocated to data tones before the truncation by using the truncation scheme, and
    wherein coded symbols to be transmitted include systematic symbols and parity symbols, and only the parity symbols are truncated according to the truncation scheme.

2. The method as claimed in claim 1, further comprising transmitting information data through remaining sub-carriers excluding sub-carriers including sub-frequency domains that are identical to the sub-carriers for transmitting the reference signals for identifying the second transmit antenna from among sub-carriers excluding the sub-carriers that transmit the reference signals for identifying the first transmit antenna, in the first mini sub-channel.

3. The method as claimed in claim 1, further comprising transmitting information data through remaining sub-carriers excluding sub-carriers including sub-frequency domains that are identical to the sub-carriers for transmitting the reference signals for identifying the first transmit antenna from among sub-carriers excluding the sub-carriers that transmit the reference signals for identifying the second transmit antenna, in the second mini sub-channel.

4. The method as claimed in claim 1, wherein information data to be transmitted is encoded according to a first predetermined coding scheme, which includes a Convolutional Turbo Coding (CTC) scheme.

5. The method as claimed in claim 1, wherein symbols to be transmitted are encoded according to a second predetermined coding scheme, which includes a Space Time Block Code (STBC) scheme.

6. A method for transmitting reference signals in a Broadband Wireless Access (BWA) communication system including a first transmit antenna, a second transmit antenna, and a plurality of sub-carriers, each of the sub-carriers occupying a sub-frequency domain, the method comprising the steps of:
    generating coded symbols by coding information data to be transmitted according to a first predetermined coding scheme;
    generating coded symbols to be transmitted through the first transmit antenna and coded symbols to be transmitted through the second transmit antenna by coding the coded symbols according to a second predetermined coding scheme;
    inserting reference signals for identifying the first transmit antenna into a second predetermined number of sub-carriers in a first mini sub-channel, the first mini sub-channel being transmitted through the first transmit antenna and occupied by a predetermined time domain and sub-frequency domains of a first predetermined number of sub-carriers;
    inserting reference signals for identifying the second transmit antenna into the second predetermined number of the sub-carriers in a second mini sub-channel, the second mini sub-channel being transmitted through the second transmit antenna and occupied by the time domain and the sub-frequency domains of the first predetermined number of sub-carriers;

inserting null data into sub-carriers including sub-frequency domains that are identical to the sub-frequency domains of the sub-carriers for transmitting the reference signals for identifying the second transmit antenna from among sub-carriers excluding the sub-carriers, which transmit the reference signals for identifying the first transmit antenna, in the first mini sub-channel;

inserting null data into sub-carriers including sub-frequency domains, which are identical to the sub-frequency domains of the sub-carriers for transmitting the reference signals for identifying the first transmit antenna from among sub-carriers excluding the sub-carriers that transmit the reference signals for identifying the second transmit antenna, in the second mini sub-channel;

inserting the coded symbols to be transmitted through the first transmit antenna into sub-carriers truncated according to a truncation scheme, which exclude the sub-carriers including the reference signals and the null data in the first mini sub-channel;

inserting the coded symbols to be transmitted through the second transmit antenna into sub-carriers truncated according to the truncation scheme, which exclude the sub-carriers including the reference signals and the null data in the second mini sub-channel;

processing signals of the first mini sub-channel to transmit the processed signals through the first transmit antenna; and processing signals of the second mini sub-channel to transmit the processed signals through the second transmit antenna, wherein the reference signals for identifying the first and second transmit antennas are inserted into sub-carriers that were previously allocated to data tones before the truncation by using the truncation scheme, and wherein the coded symbols to be transmitted include systematic symbols and parity symbols, and only the parity symbols are truncated according to the truncation scheme.

7. The method as claimed in claim 6, wherein the sub-carriers through which the reference signals for identifying the first transmit antenna are transmitted comprise sub-frequency domains different from sub-frequency domains occupied by the sub-carriers through which the reference signals for identifying the second transmit antenna are transmitted.

8. The method as claimed in claim 7, wherein inserting the coded symbols to be transmitted through the first transmit antenna comprises:

inserting the coded symbols to be transmitted through the first transmit antenna in a sequence from a coded symbol representing important information of a highest priority to remaining coded symbols into the sub-carriers excluding the sub-carriers including the reference signals and the null data in the first mini sub-channel.

9. The method as claimed in claim 7, wherein inserting the coded symbols to be transmitted through the second transmit antenna comprises:

inserting the coded symbols to be transmitted through the second transmit antenna in a sequence from a coded symbol representing important information of a highest priority to remaining coded symbols into the sub-carriers excluding the sub-carriers including the reference signals and the null data in the second mini sub-channel.

10. The method as claimed in claim 6, wherein the first coding scheme includes a Convolutional Turbo Coding (CTC) scheme.

11. The method as claimed in claim 10, wherein, in inserting the coded symbols to be transmitted through the first transmit antenna, the coded symbols to be transmitted through the first transmit antenna comprise the systematic symbols and the parity symbols, and the systematic symbols are first inserted when the coded symbols are sequentially inserted into the sub-carriers excluding the sub-carriers including the reference signals and the null data in the first mini sub-channel.

12. The method as claimed in claim 10, wherein, in inserting the coded symbols to be transmitted through the second transmit antenna, the coded symbols to be transmitted through the second transmit antenna comprise the systematic symbols and the parity symbols, and the systematic symbols are first inserted when the coded symbols are sequentially inserted into the sub-carriers excluding the sub-carriers including the reference signals and the null data in the second mini sub-channel.

13. The method as claimed in claim 6, wherein the second coding scheme includes a Space Time Block Code (STBC) coding scheme.

14. An apparatus for transmitting reference signals in a Broadband Wireless Access (BWA) communication system using a first transmit antenna, a second transmit antenna, and a plurality of sub-carriers, each of the sub-carriers occupying a sub-frequency domain, the apparatus comprising:

a first transmitter for transmitting reference signals for identifying the first transmit antenna through a second predetermined number of sub-carriers in a first mini sub-channel, the first mini sub-channel being transmitted through the first transmit antenna and occupied by a predetermined time domain and sub-frequency domains of a first predetermined number of sub-carriers, wherein, after the second predetermined number of sub-carriers in the first mini-sub-channel are truncated by using a truncation scheme, the reference signals are inserted in the truncated second predetermined number of sub-carriers in the first mini-sub-channel and transmitted; and a second transmitter for transmitting reference signals for identifying the second transmit antenna through the second predetermined number of the sub-carriers in a second mini sub-channel, the second mini sub-channel being transmitted through the second transmit antenna and occupied by the time domain and the sub-frequency domains of the first predetermined number of sub-carriers, wherein, after the second predetermined number of sub-carriers in the second mini-sub-channel are truncated by using the truncation scheme, the reference signals are inserted in the truncated second predetermined number of sub-carriers in the second mini-sub-channel and transmitted, wherein the sub-carriers through which the reference signals for identifying the first transmit antenna are transmitted comprise sub-frequency domains different from sub-frequency domains occupied by the sub-carriers through which the reference signals for identifying the second transmit antenna are transmitted, wherein the first transmitter transmits null data in the first mini sub-channel through sub-carriers including sub-frequency domains that are identical to the sub-frequency domains of the sub-carriers for transmitting the reference signals for identifying the second transmit antenna, wherein the second transmitter transmits null data in the second mini sub-channel through sub-carriers including sub-frequency domains, which are identical to the sub-frequency domains of the sub-carriers for transmitting the reference signal for identifying the first transmit antenna, and wherein the reference signals for identifying the first and second transmit antennas are inserted into sub-carriers that were previously allocated to data tones before the truncation by using the truncation scheme, and wherein coded symbols to be transmitted include systematic symbols and parity symbols, and only the parity symbols are truncated according to the truncation scheme.

15. The apparatus as claimed in claim 14, wherein the first transmitter transmits information data through remaining sub-carriers excluding sub-carriers comprising sub-frequency domains that are identical to the sub-frequency domains of the sub-carriers for transmitting the reference signals for identifying the second transmit antenna from among sub-carriers excluding the sub-carriers, which transmit the reference signals for identifying the first transmit antenna, in the first mini sub-channel.

16. The apparatus as claimed in claim 14, wherein the second transmitter transmits information data through remaining sub-carriers excluding sub-carriers comprising sub-frequency domains that are identical to the sub-frequency domains of the sub-carriers for transmitting the reference signals for identifying the first transmit antenna from among sub-carriers excluding the sub-carriers that transmit the reference signals for identifying the second transmit antenna, in the second mini sub-channel.

17. The apparatus as claimed in claim 14, wherein information data to be transmitted is encoded according to a first predetermined coding scheme, which includes a Convolutional Turbo Coding (CTC) scheme.

18. The apparatus as claimed in claim 14, wherein symbols to be transmitted are encoded according to a second predetermined coding scheme, which includes a Space Time Block Code (STBC) scheme.

19. An apparatus for transmitting reference signals in a Broadband Wireless Access (BWA) communication system using a first transmit antenna, a second transmit antenna, and a plurality of sub-carriers, each of the sub-carriers occupying a sub-frequency domain, the apparatus comprising:

a first coder for generating coded symbols by coding information data to be transmitted according to a first predetermined coding scheme;

a second coder for coding the coded symbols according to a second predetermined coding scheme in order to generate coded symbols to be transmitted through the first transmit antenna and coded symbols to be transmitted through the second transmit antenna;

a first reference signal sub-carrier inserter for inserting reference signals for identifying the first transmit antenna into a second predetermined number of sub-carriers in a first mini sub-channel, the first mini sub-channel being transmitted through the first transmit antenna and occupied by a predetermined time domain and sub-frequency domains of a first predetermined number of sub-carriers;

a first sub-carrier mapper for inserting null data into sub-carriers including sub-frequency domains that are identical to sub-frequency domains of the sub-carriers for transmitting the reference signals for identifying the second transmit antenna from among sub-carriers excluding the sub-carriers, which transmit the reference signals for identifying the first transmit antenna, in the first mini sub-channel, and inserting the coded symbols to be transmitted through the first transmit antenna into sub-carriers truncated according to a truncation scheme that exclude the sub-carriers including the reference signals and the null data in the first mini sub-channel;

a second reference signal sub-carrier inserter for inserting reference signals for identifying the second transmit antenna into the second predetermined number of the sub-carriers in a second mini sub-channel, the second mini sub-channel being transmitted through the second transmit antenna and occupied by the time domain and the sub-frequency domains of the first predetermined number of sub-carriers;

a second sub-carrier mapper for inserting null data into sub-carriers including sub-frequency domains that are identical to sub-frequency domains of the sub-carriers for transmitting the reference signals for identifying the first transmit antenna from among sub-carriers excluding the sub-carriers that transmit the reference signals for identifying the second transmit antenna, in the second mini sub-channel, and inserting the coded symbols to be transmitted through the second transmit antenna into sub-carriers truncated according to the truncation scheme that exclude the sub-carriers including the reference signals and the null data in the second mini sub-channel;

a first transmitter for processing signals of the first mini sub-channel and transmitting the processed signals through the first transmit antenna; and a second transmitter for processing signals of the second mini sub-channel and transmitting the processed signals through the second transmit antenna, wherein the reference signals for identifying the first and second transmit antennas are inserted into sub-carriers that were previously allocated to data tones before the truncation by using the truncation scheme, and wherein the coded symbols to be transmitted include systematic symbols and parity symbols, and only the parity symbols arc truncated according to the truncation scheme.

20. The apparatus as claimed in claim 19, wherein the sub-carriers through which the reference signals for identifying the first transmit antenna are transmitted comprise sub-frequency domains different from the sub-frequency domains occupied by the sub-carriers through which the reference signals for identifying the second transmit antenna are transmitted.

21. The apparatus as claimed in claim 20, wherein the first sub-carrier mapper inserts the coded symbols to be transmitted through the first transmit antenna in a sequence from a coded symbol representing important information of a highest priority to remaining coded symbols into the sub-carriers excluding the sub-carriers including the reference signals and the null data in the first mini sub-channel.

22. The apparatus as claimed in claim 20, wherein the second sub-carrier mapper inserts the coded symbols to be transmitted through the second transmit antenna in a sequence from a coded symbol representing important information of a highest priority to remaining coded symbols into the sub-carriers excluding the sub-carriers including the reference signals and the null data in the second mini sub-channel.

23. The apparatus as claimed in claim 19, wherein the first coding scheme comprises a Convolutional Turbo Coding (CTC) scheme.

24. The apparatus as claimed in claim 23, wherein the coded symbols to be transmitted through the first transmit antenna comprise the systematic symbols and the parity symbols, and wherein the first sub-carrier mapper first inserts the systematic symbols when sequentially inserting the coded symbols into the sub-carriers excluding the sub-carriers including the reference signals and the null data in the first mini sub-channel.

25. The apparatus as claimed in claim 23, wherein the coded symbols to be transmitted through the second transmit antenna comprise the systematic symbols and the parity symbols, and wherein the second sub-carrier mapper first inserts the systematic symbols when sequentially inserting the coded symbols into the sub-carriers excluding the sub-carriers including the reference signals and the null data in the second mini sub-channel.

26. The apparatus as claimed in claim 19, wherein the second coding scheme comprises a Space Time Block Code (STBC) coding scheme.

* * * * *